United States Patent
Mohideen et al.

(10) Patent No.: US 9,361,691 B2
(45) Date of Patent: Jun. 7, 2016

(54) SYSTEMS AND METHODS FOR DETECTING MISALIGNMENT BETWEEN A HELIPAD AND AN ASSOCIATED STRUCTURE

(71) Applicant: HONEYWELL INTERNATIONAL INC., Morristown, NJ (US)

(72) Inventors: Mohammed Ibrahim Mohideen, Karnataka (IN); Vivek Jain, Haryana (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/464,918

(22) Filed: Aug. 21, 2014

(65) Prior Publication Data

US 2016/0055638 A1 Feb. 25, 2016

(51) Int. Cl.
| | | |
|---|---|---|
| G06K 9/00 | (2006.01) |
| G06T 7/00 | (2006.01) |
| G01C 23/00 | (2006.01) |
| G08G 5/00 | (2006.01) |
| G06T 15/08 | (2011.01) |
| G06T 17/05 | (2011.01) |
| G08G 5/02 | (2006.01) |
| G08G 5/04 | (2006.01) |

(52) U.S. Cl.
CPC ............ *G06T 7/0026* (2013.01); *G01C 23/005* (2013.01); *G06T 7/0032* (2013.01);
(Continued)

(58) Field of Classification Search
CPC ..... G06T 7/0026; G06T 15/08; G06T 7/0032; G06T 17/05; G06T 2219/2004; G06T 2207/30184; G06T 7/0075; G06T 2207/10012; G06T 7/0022; H04N 13/0239; H04N 3013/0081
USPC ......... 382/100, 154, 109, 113, 159, 190, 151; 345/418; 348/144, 113, E13.022, 116, 348/140, 148; 703/1, 2; 701/1, 300, 400, 701/514, 520, 528, 534, 519; 370/337, 344, 370/352, 428, 503
See application file for complete search history.

(56) References Cited

U.S. PATENT DOCUMENTS

| | | | |
|---|---|---|---|
| 7,281,900 B2 * | 10/2007 | Zientek ................. | B64C 27/467 416/231 B |
| 7,925,117 B2 | 4/2011 | Hamza et al. | |

(Continued)

FOREIGN PATENT DOCUMENTS

| | | |
|---|---|---|
| EP | 2149783 A1 | 2/2010 |
| EP | 2169355 A1 | 3/2010 |

(Continued)

OTHER PUBLICATIONS

Simard et al.; Online Database Updating by Change Detection; Enhanced and Synthetic Vision 2001, Proceedings of SPIE vol. 4363 (2001) © 2001 SPIE—0277-786X/01 [Downloaded From: http://proceedings.spiedigitallibrary.org/] on Jun. 4, 2014.*

(Continued)

*Primary Examiner* — Sheela C Chawan
(74) *Attorney, Agent, or Firm* — Ingrassia Fisher & Lorenz, P.C.

(57) ABSTRACT

A system is provided for detecting misalignment between a helipad and a structure associated with the helipad. The system comprises a first database that includes first structure data, which data can comprise a location of the first structure. The system can further comprise a second database that can include second structure data, where the second structure data can comprise a location of the second structure. The second structure can comprise a helipad situated atop the first structure. The system can further comprise a processor coupled to receive the first structure data from the first database and the second structure data from the second database and can be configured, upon receipt of the first data structure and the second data structure: determine a correlation coefficient based upon a degree of overlap of the first volumetric model and the second volumetric model, and selectively generate an alert based upon the correlation coefficient.

18 Claims, 3 Drawing Sheets

(52) U.S. Cl.
CPC ............... *G06T 15/08* (2013.01); *G06T 17/05* (2013.01); *G08G 5/0021* (2013.01); *G08G 5/0086* (2013.01); *G06T 2207/30184* (2013.01); *G06T 2219/2004* (2013.01); *G08G 5/025* (2013.01); *G08G 5/045* (2013.01)

(56) References Cited

U.S. PATENT DOCUMENTS 8,570,515 B2 * 10/2013 Abdulhalim ........ G03F 7/70633
356/364

2007/0005199 A1   1/2007   He
2011/0282578 A1   11/2011  Miksa et al.

FOREIGN PATENT DOCUMENTS

EP   2228626 A2   9/2010
WO   0111383 A1   2/2001

OTHER PUBLICATIONS

Extended EP Search Report for Application No. 15180660.1-1803 dated Jan. 16, 2015.

* cited by examiner

SYSTEMS AND METHODS FOR DETECTING MISALIGNMENT BETWEEN A HELIPAD AND AN ASSOCIATED STRUCTURE

TECHNICAL FIELD

Embodiments of the present invention generally relate to detecting misalignment between a helipad and a structure associated with the helipad.

BACKGROUND

Many helipads are non-instrumented and situated in crowded or remote areas. Certain phases of helicopter operations such as approach, landing and/or take-off from such helipads may present significant challenges. For example, although onboard applications such as synthetic vision systems ("SVS") may offer situational awareness to helicopter pilots (e.g., SVS may render and/or display virtual terrain), such systems typically depend upon the accuracy of terrain, obstacle and/or navigation database information. In certain instances, data stored within one or more of these databases may come from one or more sources. This may impact the accuracy of displayed navigational or terrain data, as provided by the SVS.

To illustrate, a helicopter display may render an elevated helipad. Depending upon the accuracy of the data stored by a navigation database, (which may store, among other data, helipad location data) and/or an obstacle database (which may store, among other data, structure location data) a spatial misalignment between the location of the helipad and the location of the structure may occur. This may result in an inaccurate representation of upcoming obstacle structures and helipad on top of it, as determined by the SVS. Often, as a result, a helicopter pilot may be required rely on certain visual cues to compensate for any such misalignment.

It would therefore be desirable to have an onboard or offline system that determines and/or indicates structure and helipad misalignment. It would also desirable to develop a system that corrects and/or compensates for such misalignment

BRIEF SUMMARY

A system is provided for detecting misalignment between a helipad and a structure associated with the helipad. The system comprises a first database that includes first structure data, which data can comprise a location of the first structure. The system can further comprise a second database that can include second structure data, where the second structure data can comprise a location of the second structure. The second structure can comprise a helipad situated atop the first structure. The system can further comprise a processor coupled to receive the first structure data from the first database and the second structure data from the second database and can be configured, upon receipt of the first data structure and the second data structure: generate a first volumetric model based upon the first structure data, generate, based upon the second structure data, a second volumetric model based upon the second structure data, determine a correlation coefficient based upon a degree of overlap of the first volumetric model and the second volumetric model, and selectively generate an alert based upon the correlation coefficient.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
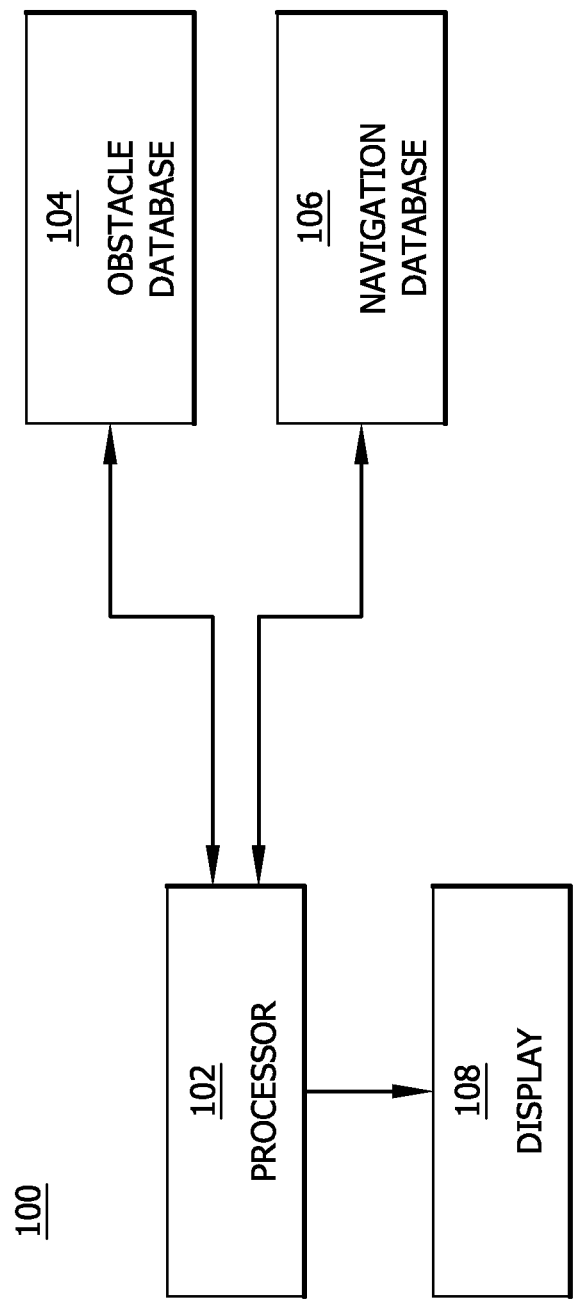
FIG. 1 illustrates, in accordance with various embodiments, a system for detecting misalignment between a helipad and an associated structure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, a "volumetric model" may comprise any three dimensional model, object, object model or the like, such as for example, any three dimensional structure or structure model, any object or object model, any structure or object profile, and the like.

As described briefly above, helicopter pilots may rely, for takeoff and landing, upon data corresponding to the location of a structure and/or the location of a helipad situated atop the structure. Typically, during takeoff and/or landing, a helicopter pilot may receive helipad location data from one database (the "navigation database") and structure data, such as the location of a structure to which the helipad is mounted, from another database (the "obstacle database"). The data comprising each database may, in many instances, be obtained from disparate sources. Thus, it is often the case that the data comprising the navigation database is different from the data comprising the obstacle database. A helicopter pilot may not, however, be aware of the disparity between the helipad coordinates and the structure coordinates. As a result, as a helicopter pilot approaches a helipad, the pilot may be surprised to find that the helipad coordinates are not in agreement with the structure coordinates; this may require that the pilot quickly correct for the unexpected disparity.

In various embodiments, then, a processor or computer-based system disposed aboard a helicopter may generate a first volumetric model of the structure atop which the helipad sits as well as a second volumetric model associated with the helipad itself. Ideally, the first volumetric model correlates well (e.g., overlaps or substantially overlaps) with the second volumetric model. However, where this is not the case, a pilot may receive an alert, prior to takeoff and/or landing that a disparity exists, so that the pilot is not taken by surprise as the pilot performs landing and/or takeoff operations.

In various embodiments, one or more databases may be loaded into the aircraft prior to the flight. As part of the flight plan, since the final destination helipad information and the structure on to which the helipad situated can be known, the system can determine the misalignment prior to takeoff or landing. Moreover, in various embodiments, for a misalignment can be detected offline by updating (e.g., periodically, such as every 28 days, every 56 days, and the like). Hence, as soon as updated databases are available, system can be applied to all elevated helipads and the structure hosting them to determine the misalignment. Thus determined misalignment can be added to one or more databases as an additional field in the one or more databases for use during real-time as an indication to the pilot of the aircraft.

With attention now to FIG. 1, a system 100 for detecting misalignment between a helipad and an associated structure is shown. The system 100 may comprise a computer-based system or processor 102, such as any processor configured to and/or capable of performing the processes described herein and/or any other helicopter operations.

The system 100 may further comprise a first database 104 (the "obstacle database"). The obstacle database 104 may comprise any tangible, non-transitory, computer or processor readable medium configured to or capable of storing data. The obstacle database 104 may store any data relating to a location and/or locations of a structure, such as a building and/or any other structure atop which a helipad may be situated. The obstacle database 104 may be communicatively and/or operatively coupled to the processor 102.

The system 100 may further comprise a second database 106 (the "navigation database"). The navigation database 106 may comprise any tangible, non-transitory, computer or processor readable medium configured to or capable of storing data. The navigation database 106 may store any data relating to a location and/or locations of a helipad. The navigation database 106 may be communicatively and/or operatively coupled to the processor 102. In various embodiments, the first and second databases may comprise a single memory or database.

The system 100 may further comprise a display 108. The display 108 may comprise any type of display (e.g., as of a computer screen or other display device) capable of and/or configured to display an alert, terrain data, structure data, helipad data, and the like. The display 108 may be communicatively and/or operatively coupled to the processor 102.

Figure 2:
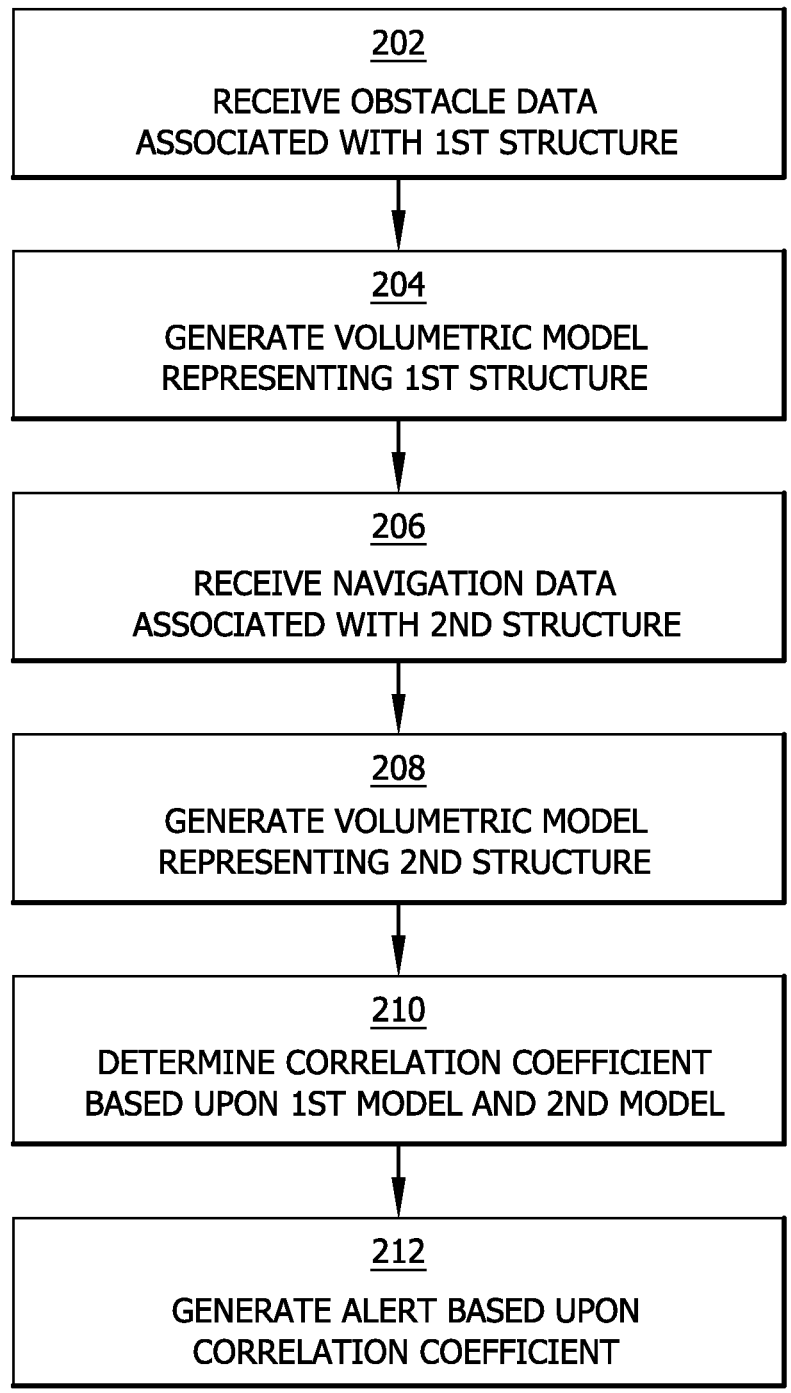
FIG. 2 illustrates, in accordance with various embodiments, a process for detecting misalignment between a helipad and an associated structure.
Figure 3B:
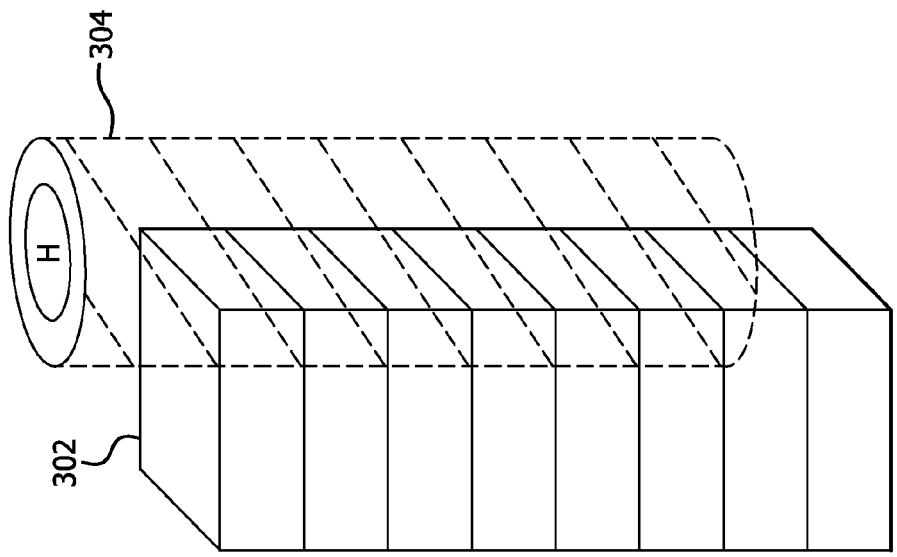
FIG. 3B illustrates, in accordance with various embodiments, a determined alignment between a structure and a helipad.
Figure 3A:
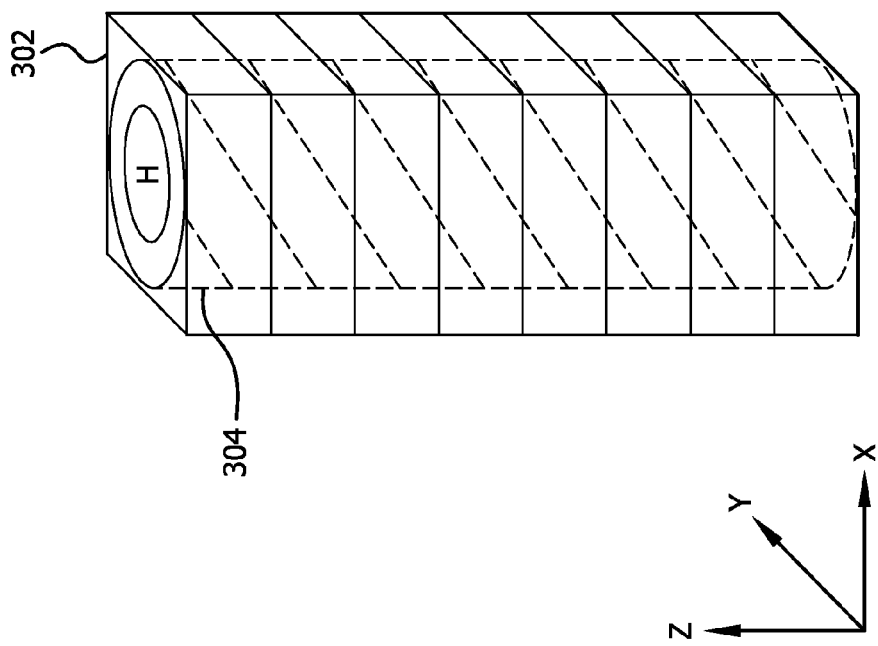
FIG. 3A illustrates, in accordance with various embodiments, a determined misalignment between a structure and a helipad.

Turning now to FIGS. 2, 3A, and 3B, a process 200 for detecting misalignment between a helipad and an associated structure is shown. In various embodiments, the processor 102 may receive first structure data ("obstacle data"), such as data associated with a location of a structure atop which a helipad sits (step 202). The obstacle data may, for example, comprise, in a Cartesian coordinate system, one or more x coordinates, one or more y coordinates, and/or one or more z coordinates, a radius associated with the structure, and/or any other dimension or coordinate associated with the structure.

Thus, the processor 102 may determine or generate a volumetric model representing the first structure (step 204), such as, for example, the structure 302. In particular, the processor 102 may generate a volumetric model representing the first structure 302 by multiplying each of the x, y, and z coordinates to obtain the volumetric model representing the first structure 302 (assuming, for example, that the first structure 302 comprises a rectangular volumetric structure). However, where the first structure 302 comprises another volumetric profile, the obstacle data associated with the first structure 302 may be used to generate, as appropriate, the volumetric model for the first structure 302. Further, in various embodiments, any of a variety of other coordinate systems (e.g., a polar coordinate system) may be used to articulate the dimensions of the first structure 302.

Similarly, in various embodiments, the processor 102 may receive second structure data ("navigation data"), such as data associated with a location of a helipad in space (step 206). The navigation data may, for example, comprise one or more of, in a Cartesian coordinate system, one or more x coordinates, one or more y coordinates, one or more z coordinates, a radius associated with the second structure and/or any other dimension or coordinate associated with the second structure, and the like. Thus, the processor 102 may determine or generate a volumetric model representing the second structure (step 208), such as, for example, the structure 304.

In particular, the processor 102 may generate a volumetric model representing the second structure 304—to give only several examples—by multiplying each of the x, y, and z coordinates and/or by multiplying the z coordinate by the constant $\pi$ as well as the radius of the second structure 304 squared (i.e., $\pi*r^2*z$) to obtain the volumetric model representing the second structure 304 (assuming, for example, that the second structure comprises a cylindrical volumetric structure). However, where the second structure 304 comprises another volumetric profile, the navigation data associated with the second structure 304 may be used to generate, as appropriate, the volumetric model for the second structure 304. Further, in various embodiments, any of a variety of other coordinate systems (e.g., a polar coordinate system) may be used to articulate the dimensions of the second structure 304.

Thus, although the second structure 304 may comprise a helipad, the volumetric model associated with the helipad may include an elevation above surface of the helipad, making the volumetric model associated with the helipad cylindrical and/or associating the volumetric model with a height or z-dimension. Moreover, as with the first structure 302, where the second structure 304 comprises another volumetric shape, the navigation data associated with the second structure 304 may be used to generate, as appropriate, the volumetric model for the second structure 304. Further, in various embodiments, any of a variety of other coordinate systems may be used to articulate the dimensions of the second structure 304.

Having generated the first and second volumetric models for each of the first and second structures, the processor 102 may determine whether the first volumetric model overlaps or superimposes, in space and/or in three dimensions and/or in two dimensions, the second volumetric model. For example, as shown with respect to FIG. 3A, the first volumetric model overlaps or superimposes the second volumetric model. In contrast, as shown with respect to FIG. 3B, the first volumetric model overlaps poorly with the second volumetric model. In particular, the second volumetric model is displaced in space along the x, y, and z axes.

In various embodiments, to determine whether the first volumetric model overlaps, in space, the second model, the processor 102 may perform a correlation analysis to obtain a correlation coefficient, such as, for example, a Pearson product-moment correlation, an intraclass correlation, any of a variety of rank correlations, and the like (step 210). The correlation coefficient may indicate a degree of overlap and/or misalignment between the first volumetric model and the second volumetric model. For example, a coefficient of zero and/or substantially zero may indicate that the models overlap well or substantially overlap. In contrast, a coefficient of one may indicate that the models overlap poorly or not at all.

In the event that the processor 102 determines, based on the correlation analysis, that the models overlap and/or substantially overlap, the processor 102 may determine that the models are not misaligned. In this instance, the processor 102 may not generate a warning alert indicating a misalignment between the first and second structure models. However, in the event that the processor 102 determines, based on the correlation analysis, that the models do not overlap, or overlap poorly, the processor 102 may generate an alert (e.g., an audible alert, a visual alert, a combination of the two, and the like) (step 212). In various embodiments, a threshold coefficient value may be set (e.g., 0.5) beyond which the processor 102 may generate the alarm.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting a misalignment between a first structure and a second structure, the method comprising:
   receiving, by a processor, first structure data, the first structure data comprising a location of the first structure;
   generating, by the processor, a first volumetric model based upon the first structure data;
   receiving, by the processor, second structure data, the second structure data comprising a location of the second structure, the second structure situated atop the first structure;
   generating, by the processor, a second volumetric model based upon the second structure data;
   determining, by the processor, a correlation coefficient based upon a degree of overlap of the first volumetric model and the second volumetric model; and
   selectively generating, by the processor, an alert indicating the misalignment based upon the correlation coefficient.

2. The method of claim 1, the method further comprising determining, by the processor the correlation coefficient prior to takeoff.

3. The method of claim 1, wherein the second structure is a helipad.

4. The method of claim 1, wherein the location of the first structure comprises, in a Cartesian coordinate system, at least one of an x coordinate, a y coordinate, or a z coordinate.

5. The method of claim 4, wherein the first volumetric model is based upon the x coordinate, the y coordinate, and the z coordinate.

6. The method of claim 1, wherein the location of the second structure comprises, in a Cartesian coordinate system, at least one of an x coordinate, a y coordinate, a z coordinate, or a radius.

7. The method of claim 1, wherein the second volumetric model is based upon a radius of the second structure, a z coordinate associated with the level of the second structure above surface, and a constant.

8. A system for detecting a misalignment between a first structure and a second structure, the system comprising:
   a first database including first structure data, the first structure data comprising a location of the first structure;
   a second database including second structure data, the second structure data comprising a location of the second structure, the second structure situated atop the first structure; and
   a processor coupled to receive the first structure data from the first database and the second structure data from the second database and configured, upon receipt of the first data structure and the second data structure, to:
      generate a first volumetric model based upon the first structure data;
      generate, based upon the second structure data, a second volumetric model based upon the second structure data;
      determine a correlation coefficient based upon a degree of overlap of the first volumetric model and the second volumetric model; and
      selectively generate an alert indicating the misalignment based upon the correlation coefficient.

9. The system of claim 8, the processor further configured to determine an overlap between the first volumetric model and the second volumetric model.

10. The system of claim 8, wherein the second structure is a helipad.

11. The system of claim 8, wherein the location of the first structure comprises, in a Cartesian coordinate system, at least one of an x coordinate, a y coordinate, or a z coordinate.

12. The system of claim 11, wherein the first volumetric model is based upon the x coordinate, the y coordinate, and the z coordinate.

13. The system of claim 8, wherein the location of the second structure comprises, in a Cartesian coordinate system, at least one of an x coordinate, a y coordinate, a z coordinate, or a radius.

14. The system of claim 8, wherein the second volumetric model is based upon a radius of the second structure, a z coordinate associated with the level of the second structure above surface, and a constant.

15. A system for detecting a misalignment between a helipad and an associated structure, the system comprising:
   an obstacle database including obstacle data, the obstacle data comprising a location of the associated structure;
   a navigation database including navigation data, the navigation data comprising a location of the helipad; and
   a processor coupled to receive the obstacle data from the obstacle database and the navigation data from the navigation database and configured, upon receipt of the obstacle data and the navigation data, to:
      generate a first volumetric model of the associated structure based upon the obstacle data;
      generate a second volumetric model of the helipad based upon the navigation data;
      determine a correlation coefficient based upon a degree of overlap of the first volumetric model and the second volumetric model; and
      selectively generate an alert indicating the misalignment based upon the correlation coefficient.

16. The system of claim 15, wherein the location of the associated structure comprises, in a Cartesian coordinate system, at least one of an x coordinate, a y coordinate, or a z coordinate.

17. The system of claim 15, wherein the location of the helipad comprises, in a Cartesian coordinate system, at least one of an x coordinate, a y coordinate, a z coordinate, or a radius.

18. The system of claim 15, wherein the first volumetric model is based upon an x coordinate, a y coordinate, and a z coordinate and wherein the second volumetric model is based upon a radius of the associated structure, a z coordinate associated with the level of the associated structure above surface, and a constant.

\* \* \* \* \*